United States Patent Office 3,338,792
Patented Aug. 29, 1967

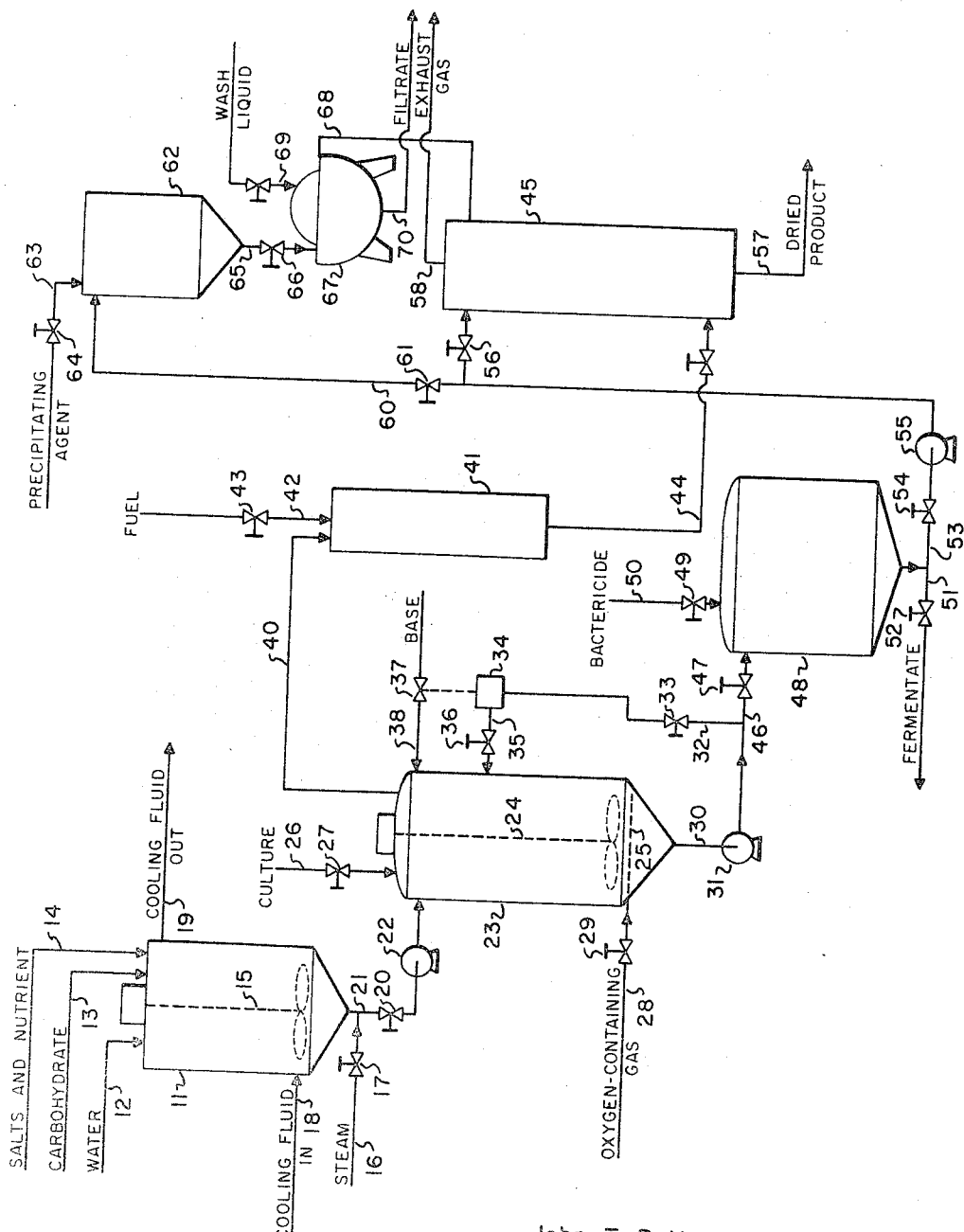

3,338,792
FERMENTATION PROCESS UTILIZING PATHOGENIC ORGANISMS
John T. Patton and Gordon P. Lindblom, Tulsa, Okla., assignors, by mesne assignments, to Esso Production Research Company, Houston, Tex., a corporation of Delaware
Filed July 30, 1963, Ser. No. 298,648
2 Claims. (Cl. 195—31)

The present invention relates to industrial fermentation and is particularly concerned with fermentation processes carried out with pathogenic organisms.

Certain fermentation processes utilized for the industrial production of chemical compounds, pharmaceutical products and other materials are carried out with microorganisms which may infect plants or animals if allowed to escape. It is therefore essential that the gases produced or expelled from such processes be sterilized before they are released to the atmosphere. This is normally done by passing the gases through a bactericidal solution, by heating them in a heat exchanger, or by filtering out the microorganisms with a bacterial filter. None of these methods is wholly satisfactory. Experience has shown that solids entrained in the gases tend to plug filters and contaminate bactericidal solutions, that the temperatures required and the residence periods necessary often make the use of heat exchangers impractical, and that the large volumes of gas which must be handled may make such techniques prohibitively expensive. Efforts to avoid these and related difficulties have in the past been largely unsuccessful.

The present invention provides an improved method for sterilizing the gases produced during industrial fermentation processes which largely eliminates the difficulties encountered heretofore. In accordance with the invention, it has now been found that pathogenic organisms present in such gases can readily be destroyed by burning a fuel in the gas stream at a rate sufficient to heat the stream to a temperature above the thermal death point of the microorganisms and spores. Studies have shown that this procedure avoids problems due to plugging, contamination, and fouling of filters, bactericidal solutions and heat exchangers; eliminates difficulties which may otherwise be encountered as a result of incomplete sterilization; and simplifies handling of the exit gas stream. The cost of carrying out such fermentation processes is generally reduced significantly as a result.

The exact nature and objects of the invention can best be understood by referring to the following detailed description of a process for the recovery of heteropolysaccharides produced by the action of bacteria of the genus Xanthomonas on carbohydrates and to the accompanying drawing illustrating that process.

The plant depicted in the drawing includes a vat or mixing vessel 11 in which a sterile medium for use in the fermentation process is prepared. The vessel is provided with line 12 through which water is introduced into the system, with line 13 for the introduction of the carbohydrate to be employed as a substrate, and with line 14 through which a bacterial nutrient and salts may be supplied. A variety of carbohydrates can be fermented with bacteria of the genus Xanthomonas to produce the heteropolysaccharide. Suitable carbohydrates include glucose, sucrose, fructose, lactose, maltose, galactose, soluble starch, cornstarch and the like. The carbohydrate utilized need not be in a highly refined state and hence a crude product having high carbohydrate content, raw sugar or sugar beet juice for example, may be employed. Unrefined carbohydrates such as these are generally less expensive than the corresponding purified materials and are therefore preferred for production of the heteropolysaccharides. The nutrient employed will generally consist of distiller's solubles or similar material containing organic nitrogen and suitable trace elements. Dipotassium acid phosphate and in some cases magnesium phosphate may be used in conjunction with the nutrient. It has been found that raw sugar juice and certain other crude carbohydrates contain the required nitrogen sources and trace elements in sufficient quantities and that the addition of a nutrient such as distiller's solubles is not always necessary. The water, carbohydrate, and nutrient, if used, are mixed in vessel 11 by means of agitator 15. High temperature steam is introduced into the mixing vessel through line 16 containing valve 17 in order to sterilize the medium and provide additional water. The sterile medium thus prepared may contain from about 1% to about 5% by weight of a carbohydrate, from about 0.01% to about 0.5% by weight of dipotassium acid phosphate, and from about 0.1% to about 10% by weight of a nutrient. The use of a sterile medium containing about 2.0% raw sugar, about 0.1% dipotassium acid phosphate, and about 0.5 of a commercial nutrient has been found to give good results but this is not necessarily an optimum composition. Other constituents may be utilized in somewhat different concentrations in order to provide an effective medium for fermentation purposes.

Following the introduction of high temperature steam into vessel 11 to sterilize the medium by heating it to a temperature of from about 200 to about 275° F. or higher for a period of from about 2 to 5 minutes or longer, the substrate is cooled to the fermentation temperature of from about 70° F. to about 100° F. A temperature between about 75° F. and about 85° F. is generally preferred. Cooling is accomplished in the plant shown by the introduction of cold water or a similar cooling fluid into a jacket or coils in mixing vessel 11. The cooling fluid is introduced through line 18 near the bottom of the vessel and withdrawn through line 19 near the top of the vessel. Cooling means other than the jacket or coils indicated may be utilized if desired.

After the cool sterile medium has been prepared as described above, valve 20 in line 21 is opened and the medium is transferred by means of pump 22 into fermentation vessel 23. The fermentation vessel, which may be of conventional design, is provided with agitator 24 and with a sparger or similar device 25 for the introduction of an oxygen-containing gas into the lower part below the agitator. An inoculum containing bacteria of the genus Xanthomonas is introduced into the fermentation vessel through line 26 containing valve 27. Any of a variety of species of bacteria of the genus Xanthomonas may be utilized. Experimental work has shown that production of the heteropolysaccharides is a characteristic trait of xanthomonads but that certain species give beter results than others. Organisms which have been found effective include Xanthomonas begoniae, Xanthomonas campestris, Xanthomonas carotae, Xanthomonas hederae, Xanthomonas incanae, Xanthomonas malvacearum, Xanthomonas papavericola, Xanthomonas phaseoli, Xanthomonas pisi, Xanthomonas translucens, Xanthomonas vasculorum and Xanthomonas vesicatoria. The oxygen-containing gas necessary for metabolism of the bacteria is introduced into the system through line 28 containing valve 29 and is bubbled upwardly through the medium from the sparger 25. Agitation in addition to that supplied by the upflowing gas may be provided by the agitator 24.

As fermentation takes place in vessel 23, the pH of the fermenting medium normally decreases due to the formation of acidic products. This generally has an adverse effect upon the heteropolysaccharide yield. In order to control this and increase the yield, a portion of the medium is withdrawn from the bottom of vessel 23 through line 30 and circulated by means of pump 31 through line 32 containing valve 33 to a pH meter 34. From the meter the medium is returned to the upper part of the fermentation vessel through line 35 containing valve 36. The pH meter, which may be of conventional design, is electrically or hydraulically connected to a motor-actuated valve 37 installed in line 38. The meter continuously measures the pH of the circulating medium. Sodium hydroxide or a similar base is admitted through line 38 in order to counteract the increase in acidity and maintain the pH of the medium at a level between about 6.0 and about 7.5, preferably between about 6.5 and about 7.2. This generally permits a significantly higher yield of the heteropolysaccharide than can be obtained without addition of the base. The amount of base required will depend upon particular agent selected, the amount of fermentate in the vessel, and the stage of the fermentatiton reaction. In lieu of an external pH meter as shown, an electrode assembly can be immersed in the medium or other conventional pH measuring equipment can be utilized. In some cases the pH of the medium can also be controlled by the addition of a buffer. This latter method is generally less effective than the system shown and has several disadvantages which dictate against its use.

The gases from fermentation vessel 23, including unconsumed oxygen, carbon dioxide produced by the bacteria, and water vapor, are withdrawn overhead through line 40 and injected into combustion vessel 41. Natural gas, methane or a similar gaseous fuel may be added to the gas stream through line 42 containing valve 43. Alternate procedures include the injection of kerosene or a similar liquid fuel into the gas stream and passage of the gas over charcoal or a similar solid fuel. The amount of fuel required will depend primarily upon the volume and composition of the exit gas from the fermentation vessel and can generally be determined stoichiometrically. Sufficient heat to raise the temperature of the entire gas stream to about 250° F. or higher should be generated. Temperatures in excess of about 300° F. are preferred. Oxygen can be added to the gas stream if necessary to achieve the desired temperatures. Combustion of the fuel incinerates microorganisms and spores present in the gas from the fermentation vessel and thus renders the gas stream sterile. The combustion chamber will normally be insulated to reduce heat losses and extend the life of the vessel and may be provided with an electrical igniter or similar device. Any of a variety of different burners may be utilized in the vessel. The combustion products from vessel 41 may be passed through line 44 to dryer 45, or in some cases where a liquid product is desired may be discharged to the atmosphere. Since the combustion products are essentially free of living microorganisms, there is no danger of contamination.

The medium introduced into vessel 23 is permitted to ferment at a temperature between about 70° F. and about 100° F., preferably between about 75° F. and about 85° F., for a period of from 1 to 3 days. As fermentation progresses, the viscosity of the medium increases due to conversion of carbohydrate into heteropolysaccharide. After the viscosity has reached the desired level, the reaction may be halted. The reaction is normally considered complete when the fermentate diluted with 6 parts of distilled water has a viscosity of about 70 centipoises or higher as measured with a Brookfield viscometer and a UL adapter at 3 r.p.m. In a properly controlled process, this point is normally reached after about 48 hours. The fermentate thus prepared is a thick viscous solution which has a dull yellow color and contains bacterial cells, unconverted carbohydrate, and from about 0.5% to about 3% by weight of heteropolysaccharide. This material is withdrawn from the vessel and circulated by means of pump 31 through line 46 containing valve 47 into storage vessel 48. Hexachlorophene, formaldehyde or a similar bactericide may be added to the fermentate in the storage vessel through line 49 containing valve 50 in order to kill the bacteria and preserve the polymer product. In lieu of adding a bactericide, the solution may be heat sterilized to kill the microorganisms and spores. Where a dry product is not required, the fermentate may be withdrawn from the system through line 51 containing valve 52. Tests have shown the fermentate thus recovered is useful in oilfield drilling fluids and in certain other applications where product purity is not highly critical.

Although the fermentate may be recovered in the liquid state as described above, there are many instances where a dry product is preferred. In such cases, fermentate previously produced is withdrawn from storage vessel 48 through line 53 containing valve 54 and is circulated by means of pump 55 to dryer 45 through valve 56. The dryer thus employed for drying the whole fermentate will normally be a spray dryer of conventional design but other drying apparatus capable of utilizing hot gas from an external source or from a burner within the apparatus may be used. If a dryer of the latter type containing an internal burner is employed, combustion chamber 41 may be eliminated. Fuel gas injected into the system through line 42 and exhaust gases from fermentation vessel 23 may be passed directly to the burner in the drying apparatus. The dried product is recovered as indicated by line 57; while exhaust gases from the dryer are taken off overhead through line 58. The dried fermentate is normally produced as a soft, finely-divided powder having a yellowish color similar to that of the liquid fermentate. This material may also be employed in oilfield drilling fluids and other compositions.

In lieu of drying the whole fermentate as described in the previous paragraph, it is often preferable to separate the heteropolysaccharide from the liquid fermentate and dry only the polymer thus recovered. This may be done by closing valve 56 and circulating the fermentate through line 60 containing valve 61 to treating vessel 62. Here the liquid fermentate may be treated with a precipitating agent introduced through line 63 containing valve 64 in order to precipitate the heteropolysaccharide and permit its recovery. The precipitating agent employed may comprise an aqueous methanol solution containing potassium chloride, sodium chloride or a similar salt; a similar solution containing ethanol, acetone or a similar solvent in place of the methanol; or an aqueous solution which contains polyvalent cations and has a pH in excess of about 8.5, preferably in excess of about 10. Suitable polyvalent cation solutions include solutions of calcium hydroxide, basic lead acetate, lead hydroxide, barium hydroxide and the like. If desired, a water-soluble salt of barium, cadmium, calcium, lead, magnesium, nickel, strontium, zinc or similar polyvalent metal and a base such as sodium hydroxide, potassium hydroxide or ammonium hydroxide may be added individually in lieu of a solution which contains polyvalent cations and has a high pH. Tests have shown that the addition of such salts to the fermentate in concentrations in excess of about 0.05% by weight and the subsequent addition of a base in concentration sufficient to raise the pH to a value in excess of about 8.5 will readily precipitate the heteropolysaccharide and permit its separation from the fermentate. A slurry containing the fermentate thus obtained is transferred from the treating vessel through line 65 containing valve 66 to filter 67. Here the precipitated solids, including the heteropolysaccharide and insolubles present in the fermentate, are separated from the liquid constituents and introduced into dryer 45 as indicated by line 68. The filtered solids may be washed with methanol, caustic solution or a similar medium supplied through line 69. The filtrate is withdrawn through line 70. The remaining moisture is removed from the solids within the dryer. The dried product is recovered as indicated by line 57. The material thus obtained is of higher purity than that prepared by drying the whole fermentate and may be preferred for use in food-stuffs, pharmaceuticals and certain other products.

A product of still higher purity can be obtained by filtering or centrifuging the fermentate to remove the bacterial cells and other insoluble constituents prior to the precipitation step. The liquid recovered from this initial filtration step contains the heteropolysaccharide and water-souble constituents from the fermentate. Upon the addition of an organic solvent and electrolyte or an aqueous polyvalent cation solution of suitably high pH, the heteropolysaccharide can be recovered substantially free of contaminants. Repeated precipitation may be used to assure high purity if desired. The precipitate thus obtained may then be dried as described earlier to produce a powdered material suitable for use in applications requiring a polymer of high purity.

It will be apparent from the foregoing that the process of the invention obviates difficulties encountered heretofore in sterilizing the off-gases from fermentation reactions and at the same time permits utilization of the heat generated in the sterilizing step for drying of the product. Although the process has been described in terms of the fermentation of an aqueous carbohydrate solution with bacteria of the genus Xanthomonas, it will be recognized that the process is not limited to the particular fermentation set forth and may be applied to fermentation reactions carried out with other microorganisms. The economies made possible by the process make it attractive for the production of a variety of different fermentation products.

What is claimed is:

1. In a process for the production of a heteropolysaccharide wherein an aqueous carbohydrate solution is fermented with bacteria of the genus Xanthomonas and an oxygen-containing gas in which xanthomonads are present is evolved during fermentation, the improvement which comprises collecting the evolved gas, burning a sufficient quantity of fuel in the presence of said gas to incinerate said xanthomonads, contacting the fermentate produced from said carbohydrate solution with hot combustion products generated by the burning of said fuel, and recovering a dried product.

2. In a process for the production of a heteropolysaccharide wherein an aqueous carbohydrate solution is fermented with bacteria of the genus Xanthomonas and an oxygen-containing gas in which xanthomonads are present is evolved during fermentation, the improvement which comprises collecting the evolved gas, burning a sufficient quantity of fuel in the presence of said gas to incinerate said xanthomonads, precipitating heteropolysaccharide from the fermentate produced from said carbohydrate solution, contacting the precipitate with hot combustion products generated by the burning of said fuel, and recovering a dried product.

References Cited

UNITED STATES PATENTS

| | | | |
|---|---|---|---|
| 1,717,100 | 6/1929 | Downes | 195—107 |
| 2,043,265 | 6/1936 | Roeder | 195—144 |
| 2,674,339 | 4/1954 | Schneider | 23—277 |
| 2,970,088 | 1/1961 | Freeman | 195—139 |
| 3,020,206 | 2/1962 | Patton et al. | 195—31 |
| 3,020,207 | 2/1962 | Patton | 195—31 |

OTHER REFERENCES

Frobisher: Fundamentals of Microbiology, 5th ed., p. 206.

Stanier et al.: The Microbial World, pub. by Prentice Hall, 1957, p. 569.

ALVIN E. TANENHOLTZ, *Primary Examiner.*

A. LOUIS MONACELL, *Examiner.*